US012565853B2

(12) United States Patent
Ramey et al.

(10) Patent No.: US 12,565,853 B2
(45) Date of Patent: Mar. 3, 2026

(54) ENGINE CYLINDER HEAD WITH TEMPERATURE-REDUCING PRESSURE SENSOR BORE

(71) Applicant: Caterpillar Inc., Peoria, IL (US)

(72) Inventors: Steven Ramey, Lafayette, IN (US); Alin R. Olaru, Peoria, IL (US); Jonathan R. Chittenden, West Lafayette, IN (US); Viorel Petrariu, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/753,525

(22) Filed: Jun. 25, 2024

(65) Prior Publication Data

US 2025/0389222 A1 Dec. 25, 2025

(51) Int. Cl.
*F02B 77/08* (2006.01)
*F02F 1/40* (2006.01)
*F02F 1/42* (2006.01)

(52) U.S. Cl.
CPC .............. *F02B 77/085* (2013.01); *F02F 1/40* (2013.01); *F02F 1/4235* (2013.01)

(58) Field of Classification Search
CPC ......... F02B 77/085; F02F 1/40; F02F 1/4235; F02F 1/26; F02F 1/36; F02D 35/023
See application file for complete search history.

(56) References Cited

U.S. PATENT DOCUMENTS

| | | | | |
|---|---|---|---|---|
| 5,101,659 A * | 4/1992 | Takeuchi | ................ | G01L 23/10 73/114.19 |
| 5,195,365 A | 3/1993 | Chujo et al. | | |
| 9,416,738 B2 | 8/2016 | Suzuki et al. | | |
| 2007/0180898 A1* | 8/2007 | Nagel | .................... | F02M 65/00 73/114.77 |
| 2011/0040475 A1* | 2/2011 | Taibi | ..................... | F02D 35/023 73/114.02 |
| 2016/0160776 A1* | 6/2016 | Yeager | .................. | F02D 35/023 123/435 |
| 2017/0146415 A1 | 5/2017 | Hashimoto | | |
| 2022/0003185 A1* | 1/2022 | Ohata | ..................... | F02P 5/152 |

FOREIGN PATENT DOCUMENTS

| | | |
|---|---|---|
| JP | 2010090809 A | 4/2010 |
| JP | 4905834 B2 | 3/2012 |
| WO | 2017039614 A1 | 3/2017 |

* cited by examiner

*Primary Examiner* — Grant Moubry
(74) *Attorney, Agent, or Firm* — Bookoff McAndrews, PLLC

(57) ABSTRACT

In one instance, an engine cylinder head includes: an intake passage; an exhaust passage; a coolant channel having a first outer surface including a first portion and a second portion, the first portion being shared with the intake passage and the second portion being shared with the exhaust passage; a lubricant channel; and an in-cylinder pressure sensor (ICPS) bore at least partially defined by at least one wall having at least one second outer surface including a third portion and a fourth portion, the third portion being shared with the coolant channel and the fourth portion being shared with the lubricant channel.

15 Claims, 5 Drawing Sheets

ENGINE CYLINDER HEAD WITH TEMPERATURE-REDUCING PRESSURE SENSOR BORE

TECHNICAL FIELD

The present disclosure relates generally to engine cylinder heads, and more particularly, to an engine cylinder head with a temperature-reducing pressure sensor bore.

BACKGROUND

Engines, e.g., internal combustion engines (ICEs), produce torque that can be used to power a machine by translating pressure generated through combustion within one or more engine cylinders into the rotation of a drive shaft. To operate efficiently, some engines measure the pressure within the engine cylinders to more precisely control one or more components of the engine, for example, using a controller configured to orchestrate the operation of the engine. It is therefore desirable for the engine to include one or more pressure sensors capable of gauging the pressure within the engine cylinders, e.g., an in-cylinder pressure sensor (ICPS). However, disposing a pressure sensor close enough to an engine cylinder to gauge the pressure of the engine cylinder may expose the pressure sensor to the heat produced by combustion within the engine cylinder, which may damage the pressure sensor or otherwise render the pressure sensor ineffective. Thus, preventing pressure sensor overheating due to heat produced within engine cylinders is beneficial to the efficient operation of the engine.

A cylinder internal pressure sensor that may be capable of removing the influence of temperature on the readings and/or outputs of the cylinder internal pressure sensor is described in U.S. Publication No. 2017/0146415 (the '415 publication). For example, the cylinder internal pressure sensor of the '415 publication may include a heating element and/or a thermal insulation member configured to heat the cylinder internal pressure sensor to a predetermined temperature that is higher than a temperature that the cylinder internal pressure sensor would reach due to being subjected to the heat of combustion within an engine cylinder, and keep the cylinder internal pressure sensor at the elevated predetermined temperature, such that the readings and/or outputs of the cylinder internal pressure sensor will be unaffected by the heat of combustion. However, the '415 publication does not describe an engine cylinder head having a pressure sensor bore configured to reduce a temperature of a pressure sensor disposed within it.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, an engine cylinder head may include: an intake passage; an exhaust passage; a coolant channel having a first outer surface including a first portion and a second portion, the first portion being shared with the intake passage and the second portion being shared with the exhaust passage; a lubricant channel; and an in-cylinder pressure sensor (ICPS) bore at least partially defined by at least one wall having at least one second outer surface including a third portion and a fourth portion, the third portion being shared with the coolant channel and the fourth portion being shared with the lubricant channel.

In another aspect, an engine cylinder head may include: a central longitudinal axis, a central lateral axis, and a central normal axis orthogonal to the central longitudinal axis and the central lateral axis, wherein the central longitudinal axis and the central normal axis define a first plane having a first side and a second side, and wherein the central lateral axis and the central normal axis define a second plane having a third side and a fourth side; an intake passage disposed on the first side of the first plane; an exhaust passage disposed on the second side of the first plane; an intake manifold disposed on the third side of the second plane; and an in-cylinder pressure sensor (ICPS) bore disposed within the engine cylinder head on the first side of the first plane and on the fourth side of the second plane.

In another aspect, an engine cylinder head system may include: an engine cylinder head including: an intake passage; an exhaust passage; a coolant channel having a first outer surface including a first portion and a second portion, the first portion being shared with the intake passage and the second portion being shared with the exhaust passage; a lubricant channel; and an in-cylinder pressure sensor (ICPS) bore including a first segment having a first diameter and being at least partially defined by a first wall having a second outer surface, the first wall sharing a third portion of the second outer surface with the coolant channel, and a second segment having a second diameter that is smaller than the first diameter and being at least partially defined by a second wall having a third outer surface, the second wall sharing a fourth portion of the third outer surface with the lubricant channel; and an ICPS disposed within the ICPS bore.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
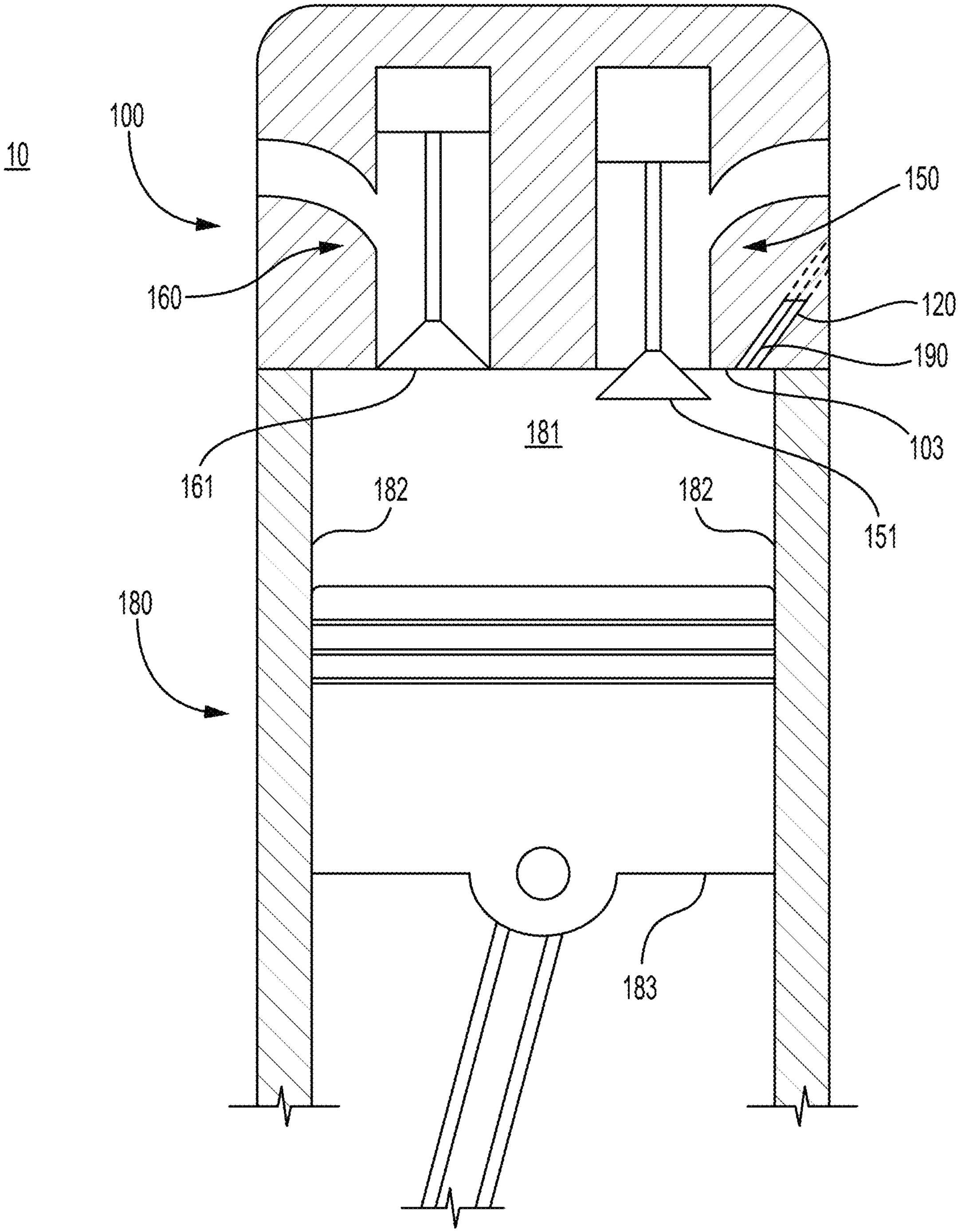
FIG. 1 depicts a schematic and sectional view of an engine cylinder head and an engine cylinder.

FIG. 1 depicts a schematic and sectional view of an engine cylinder head 100 and an engine cylinder 180 of an engine 10. As depicted in FIG. 1, the engine cylinder head 100 may be configured to form part (e.g., the top) of a combustion chamber 181. For example, the top of the combustion chamber 181 may be defined by a bottom surface 103 of the engine cylinder head 100, the sides of the combustion chamber 181 may be defined by an inner surface 182 of the engine cylinder 180, and the bottom of the combustion chamber 181 may be defined by the top surface of a piston 183 disposed within the engine cylinder 180. The engine cylinder head 100 may be configured to be incorporated into a cylinder block along with a plurality of other, similar engine cylinder heads.

The engine cylinder head 100 may include one or more intake passages 150 and one or more exhaust passages 160 that are open to the bottom surface 103 of the engine cylinder head 100. The one or more intake passages 150 may be configured to receive one or more intake valves 151 operative to allow or prevent fluid communication between the one or more intake passages 150 and the combustion chamber 181. Similarly, the one or more exhaust passages 160 may be configured to receive one or more exhaust valves 161 operative to allow or prevent fluid communication between the one or more exhaust passages 160 and the combustion chamber 181. The engine cylinder head 100 may also include an intake manifold 170 (FIGS. 4A and 4B) configured to allow air to enter the one or more intake passages 150. In addition to the one or more intake passages 150, the one or more exhaust passages 160, and/or the intake manifold 170, the engine cylinder head 100 may also include one or more openings or bores configured to receive one or more electronically-controlled engine components and sensors, such as a fuel injector, a spark plug, an ion sensor and/or an in-cylinder pressure sensor (ICPS) 190. For example, as described in further detail below, the engine cylinder head 100 may include an ICPS bore 120 configured to receive an ICPS 190. The ICPS 190, also referred to as an "in-cylinder pressure transducer," may be an electronic sensor that detects and/or outputs a signal corresponding to the pressure with a combustion chamber 181. The ICPS 190 may be a piezoelectric sensor that produces a change in voltage in response to a change in force, e.g., pressure, applied to a probe of the ICPS 190. A change in voltage produced by the ICPS 190 disposed within a combustion chamber 181 may therefore be used to determine a corresponding change in pressure within the combustion chamber 181. However, the ICPS 190 may include any other appropriate type of sensor, such as a strain gauge. An engine cylinder head system may include an engine cylinder head 100 and an ICPS 190 disposed within an ICPS bore 120 of the engine cylinder head 100.

Figure 2:
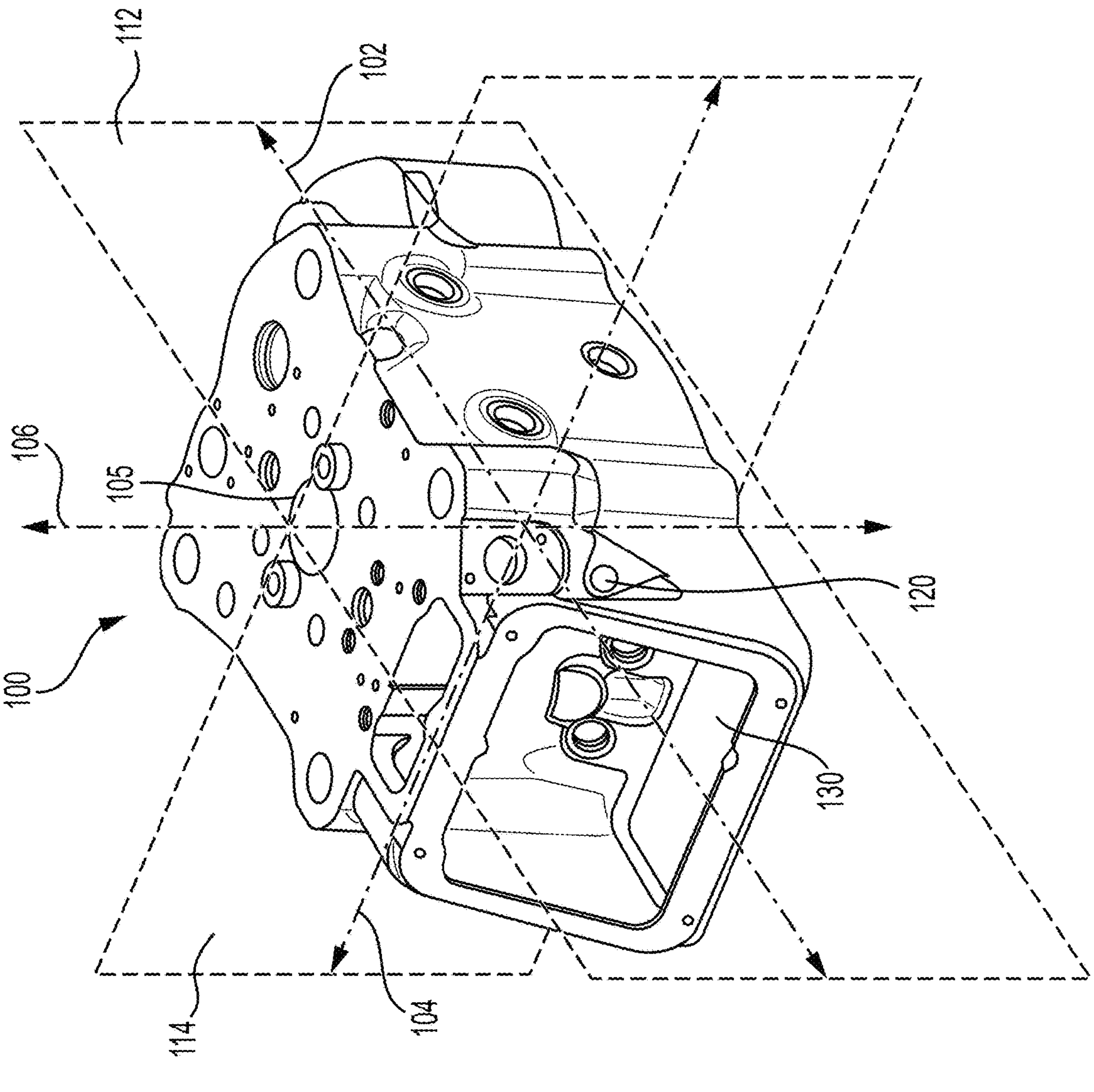
FIG. 2 depicts a perspective view of an engine cylinder head with a temperature-reducing pressure sensor bore.

Referring now to FIG. 2, the engine cylinder head 100 may define a central longitudinal axis 102 and a central lateral axis 104 that is perpendicular to the central longitudinal axis 102. Both the central longitudinal axis 102 and the central lateral axis 104 may bisect a central bore 105 (e.g., for receiving a fuel injector). The central bore 105 may be centered about a central normal axis 106 that is orthogonal to both the central longitudinal axis 102 and the central lateral axis 104. The central normal axis 106 and the central longitudinal axis 102 may define a first plane 112 that divides the engine cylinder head 100 into two substantially equal halves. The central normal axis 106 and the central lateral axis 104 may define a second plane 114 that is orthogonal to the first plane 112.

Figure 3:
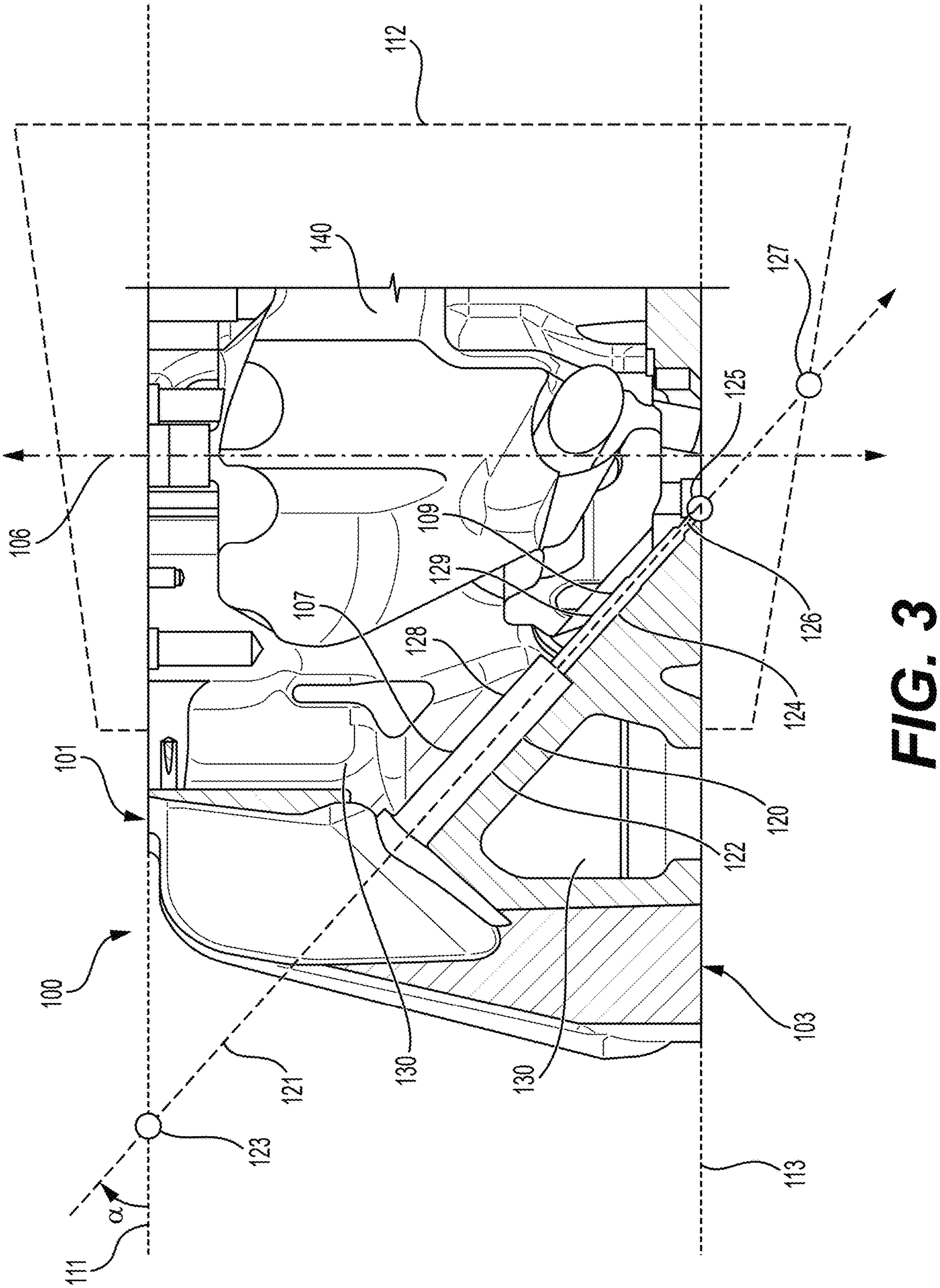
FIG. 3 depicts a sectional view of an engine cylinder head with a temperature-reducing pressure sensor bore.

Referring now to FIG. 3, the engine cylinder head 100 may include a substantially flat top surface 101 (e.g., for receiving a valve cover) that defines a third plane 111. The engine cylinder head 100 may also include a substantially flat bottom surface 103 (e.g., for connecting to an engine block) that defines a fourth plane 113 that is parallel to the third plane 111. Both the third plane 111 and the fourth plane 113 may be orthogonal to the first plane 112 and to the second plane 114. The ICPS bore 120 may be formed or disposed within the engine cylinder head 100 at an angle relative to the first plane 112, the second plane 114, the third plane 111, and the fourth plane 113. As depicted in FIG. 3, the ICPS bore 120 may be defined by the interior surface(s) of one or more walls within the engine cylinder head 100. In some aspects, the position and orientation of the ICPS bore 120 may reduce the amount of heat that the ICPS 190 disposed within the ICPS bore 120 is exposed to during the operation of the engine 10. This reduction in heat may be achieved by disposing the ICPS 190 away from one or more passages configured to receive a relatively hot gas and/or disposing the ICPS 190 in a location that is adjacent to one or more channels configured to receive a relatively cool fluid (e.g., engine oil and/or engine coolant).

For example, in some instances, as depicted in FIG. 3, the ICPS bore 120 may define a longitudinal axis that extends along a direction 121 that is transverse to one or both of the third plane 111 and the fourth plane 113 at acute or obtuse angles. In the example depicted in FIG. 3, the direction 121 extends from the third plane 111 toward the fourth plane 113, intersecting the third plane 111 at a point 123 and the fourth plane 113 at a point 125. In this example, the direction 121 forms an acute angle α with both plane 111 and plane 113. Thus, as shown in FIG. 3, the ICPS bore 120 may extend up and away from a combustion chamber 181 formed in part by the engine cylinder head 100. Additionally or alternatively, as shown in FIG. 3, the ICPS bore 120 may be disposed along a direction 121 that is transverse to the first plane 112. In the example depicted by FIG. 3, the direction 121 intersects with the first plane 112 at a point 127.

The ICPS bore 120 may also be disposed within the engine cylinder head 100 such that only a lowermost tip of the ICPS bore 120, or a lowermost tip of the ICPS 190 disposed within the ICPS bore 120, is exposed to a combustion chamber 181 formed in part by the engine cylinder head 100 (as described above), e.g., the lowermost tip of the ICPS bore 120 may be disposed at point 125. In this way, the ICPS bore 120 may not only extend up and away from a combustion chamber 181 formed in part by the engine cylinder head 100, but may also extend away from an exhaust passage 160, which is generally hotter than the intake passage 150 during the operation of an engine that includes the engine cylinder head 100. The exhaust passage 160 is generally hotter than the intake passage 150 during the operation of the engine 10 due to relatively cool air being provided to the intake passage 150 by the intake manifold 170 and relatively hot exhaust being expelled from the combustion chamber through the exhaust passage 160.

Figure 4A:
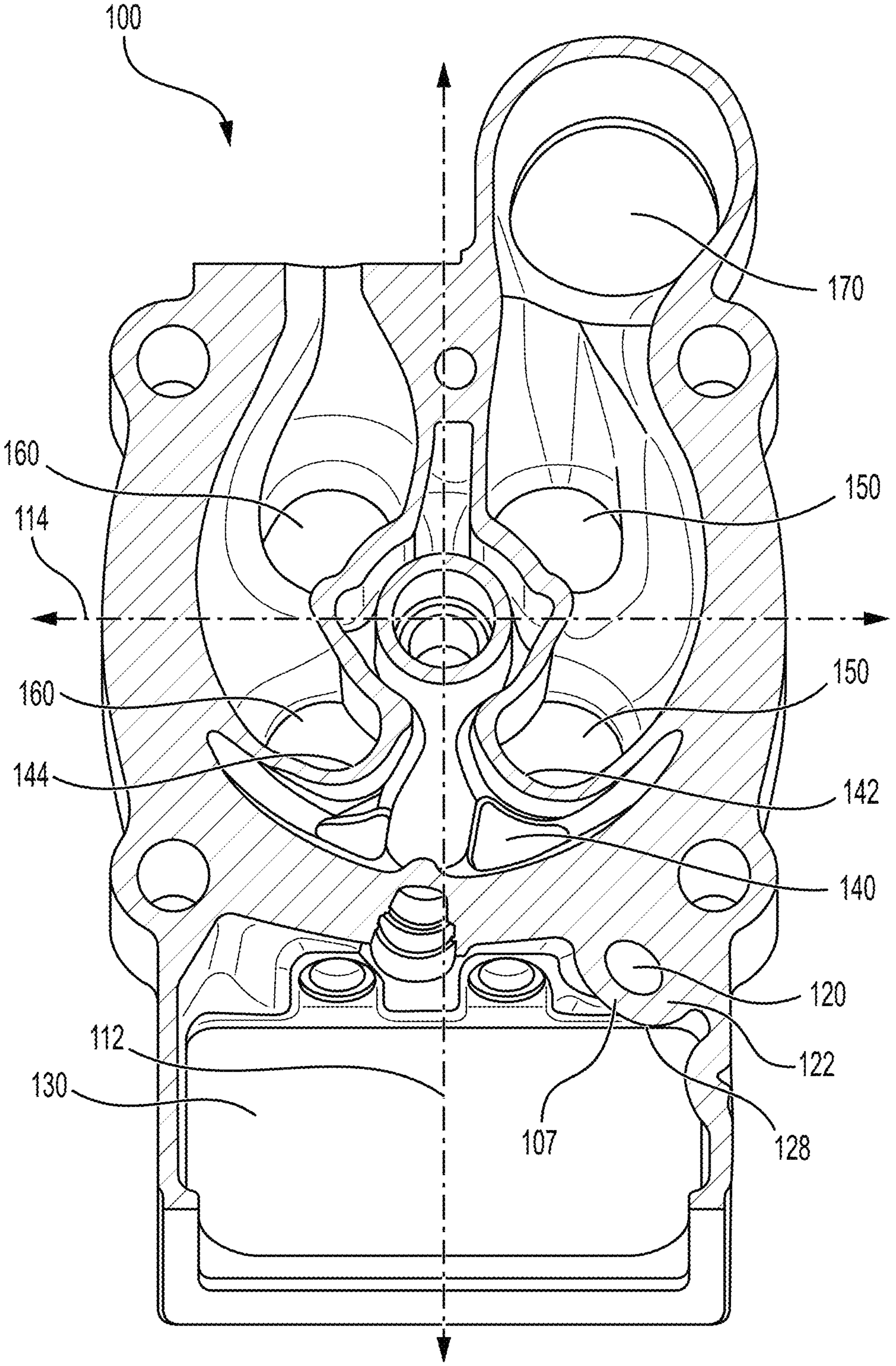
FIGS. 4A and 4B depict sectional views of an engine cylinder head with a temperature-reducing pressure sensor bore.
Figure 4B:
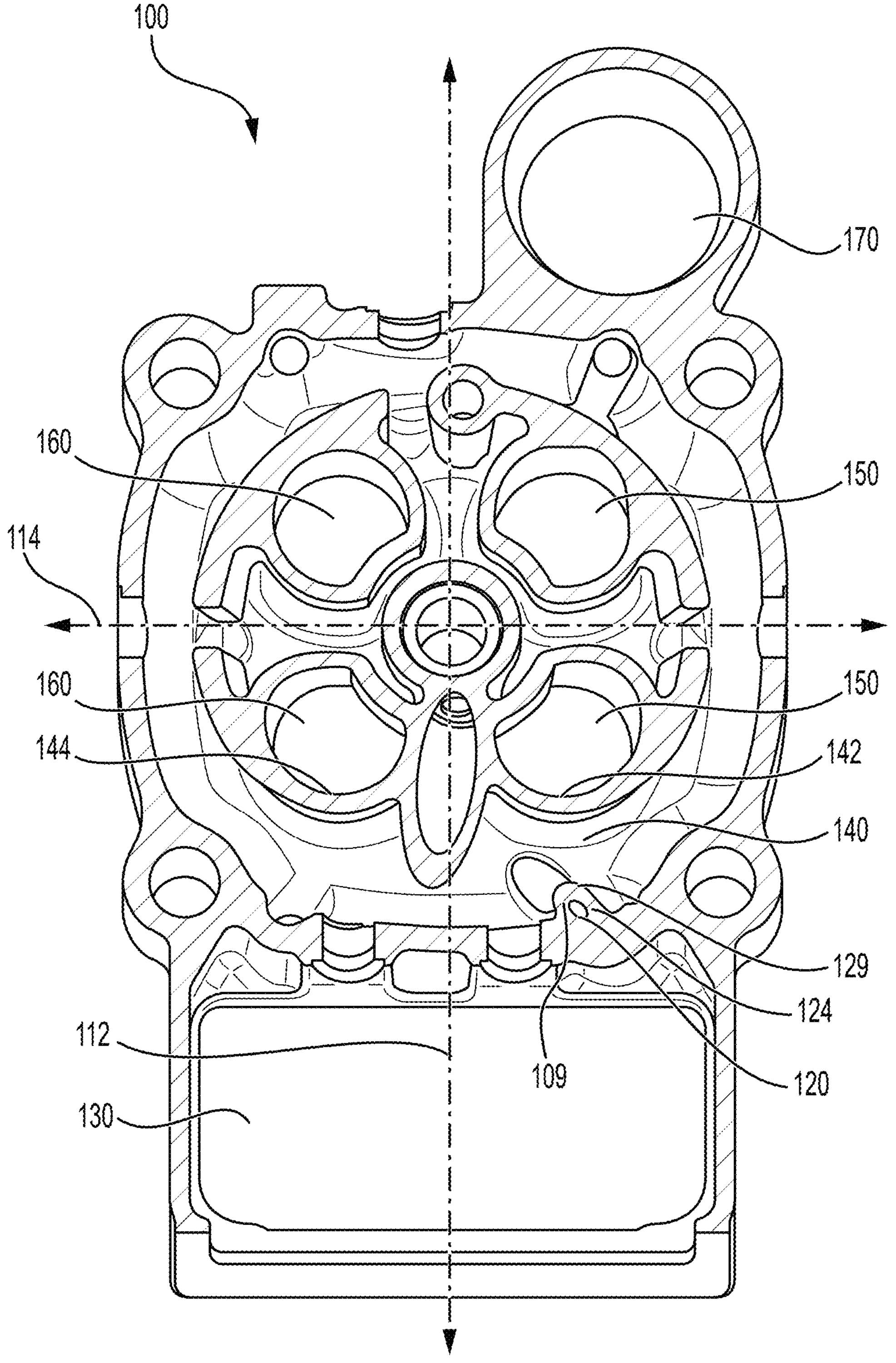

Referring now to FIGS. 4A and 4B, FIG. 4A depicts a cross-sectional view of the engine cylinder head 100 along a fifth plane that is between and parallel to the third plane 111 and the fourth plane 113, such that FIG. 4A depicts a cross-sectional view of the first segment 122 of the ICPS bore 120. FIG. 4B depicts a cross-sectional view of the engine cylinder head 100 along a sixth plane that is between and parallel to the third plane 111 and the fourth plane 113 and closer to the fourth plane than the fifth plane, such that FIG. 4B depicts a cross-sectional view of the second segment 124 of the ICPS bore 120.

In some instances, as depicted in FIGS. 4A and 4B, the first plane 112 may separate the engine cylinder head 100 into a first side on which an intake passage 150 is disposed and a second side on which an exhaust passage 160 is disposed. In this example, the ICPS bore 120 may be disposed on the first side of the first plane 112, which may be cooler than the second side of the first plane 112 due to a temperature difference between the intake passage 150 and the exhaust passage 160, as described above.

Additionally or alternatively, in some instances, as depicted in FIGS. 4A and 4B, the second plane 114 may separate the engine cylinder head 100 into a third side on which the intake manifold 170 is disposed and a fourth side on which the lubricant channel 130 is disposed. In this example, the ICPS bore 120 may be disposed on the fourth side of the second plane 114, which may be cooler than the third side of the second plane 114 due to being in closer proximity to the lubricant channel 130 and/or being further from the exhaust passage 160.

Thus, as depicted in FIGS. 4A and 4B, in some instances, the ICPS bore 120 may be disposed within a quadrant defined by the first side of the first plane 112 and the fourth side of the second plane 114 that is furthest from the exhaust passage 160 and closest to the lubricant channel 130, thereby reducing the amount of heat that the ICPS 190 disposed within the ICPS bore 120 is exposed to during the operation of an engine that includes the engine cylinder head 100 more than any other quadrant defined by the first plane 112 and the second plane 114 would.

Still referring to FIGS. 4A and 4B, the engine cylinder head 100 may include a lubricant channel 130 and a coolant channel 140. FIGS. 4A and 4B depict a cross-sectional view of the engine cylinder head 100. As depicted in FIGS. 4A and 4B, the lubricant channel 130 may be in fluid communication with a lubricating system (not shown) of an engine into which the engine cylinder head 100 is incorporated, such that a lubricant, e.g., an engine oil, may be received by and through the engine cylinder head 100. The lubricating system may include a lubricant tank, a lubricant pump, and a network of lubricant channels configured to provide lubricant to various components of the engine. A lubricant may be received by and through the engine cylinder head 100, e.g., via lubricant channel 130, to lubricate various components of the engine cylinder head 100, or various engine components disposed within the engine cylinder head 100. In addition to lubricating, the lubricant may also be used to clean and/or cool components included in or disposed within the engine cylinder head 100.

The coolant channel 140 may be in fluid communication with a cooling system (not shown) of an engine into which the engine cylinder head 100 is incorporated, such that a coolant, e.g., antifreeze, may be received by and through the engine cylinder head 100. The cooling system may include a coolant tank, a coolant pump, and a network of coolant channels configured to provide coolant to various components of an engine. A coolant may be received by and through the engine cylinder head 100 to cool various components of the engine cylinder head 100, or various engine components disposed within the engine cylinder head 100. Both the lubricant channel 130 and the coolant channel 140 may be configured to reduce the temperature within the engine cylinder head 100 during operation of an engine into which the engine cylinder head 100 is incorporated. As depicted in FIGS. 4A and 4B, the coolant channel 140 may share a first portion 142 of its outer surface with the intake passage 150 and a second portion 144 of its outer surface with the exhaust passage 160.

Referring now to FIGS. 3, 4A, and 4B, a wall that at least partially defines the ICPS bore 120 may share various portions of its outer surface with the lubricant channel 130 or the coolant channel 140. As mentioned above, either or both of the lubricant channel 130 and the coolant channel 140 may be used to reduce the temperature within the engine cylinder head 100 during the operation of an engine 10 that includes the engine cylinder head 100. Accordingly, by positioning a wall that at least partially defines the ICPS bore 120 to be in contact with (e.g., sharing one or more portions of its outer surface with) either or both of the lubricant channel 130 and the coolant channel 140, the amount of heat that the ICPS 190 disposed within the ICPS bore 120 is exposed to during the operation of the engine 10 may be reduced. For example, as depicted in FIGS. 3 and 4A, a first wall 107 that at least partially defines the ICPS bore 120 may share a first portion 128 of its outer surface with the lubricant channel 130. Additionally or alternatively, as depicted in FIGS. 3 and 4B a second wall 109 that at least partially defines the ICPS bore 120 may share a second portion 129 of its outer surface with the coolant channel 140.

Still referring to FIGS. 3, 4A, and 4B, the ICPS bore 120 may include different segments, and the different segments of the ICPS bore 120 may be defined by different walls in contact with different combinations of the lubricant channel 130 and the coolant channel 140. For example, as depicted in FIGS. 3, 4A, and 4B, the ICPS bore 120 may include a first segment 122 at least partially defined by the first wall 107 that includes the first portion 128 of its outer surface shared with the lubricant channel 130, as described above. The ICPS bore 120 may include a second segment 124 at least partially defined by the second wall 109 that includes the second portion 129 of its outer surface shared with the coolant channel 140. However, the ICPS bore 120 may include any number of segments defined by any number of walls in contact with any combination of the lubricant channel 130 and the coolant channel 140. For example, the first segment 122 may be at least partially defined by a wall in contact with only the lubricant channel 130, while the second segment 124 may be at least partially defined by a wall in contact with both the lubricant channel 130 and the coolant channel 140.

The different segments of the ICPS bore 120 may have similar or different diameters. For example, as depicted in FIGS. 4A and 4B, the first segment 122 and the second segment 124 may have different diameters, e.g., the diameter of the first segment 122 may be larger than the diameter of the second segment 124. Or for example, as depicted in FIG. 3, the ICPS bore 120 may include a first segment 122, a second segment 124, and a third segment 126 with progressively smaller diameters (e.g., three different segments with three different diameters).

INDUSTRIAL APPLICABILITY

The devices and systems disclosed herein may find application in any machine that employs an engine cylinder head 100. In particular, the devices and systems disclosed herein may be advantageously used in any machine for which it is desirable to gauge the pressure within a combustion chamber of an engine of the machine.

Referring again to FIG. 1, as mentioned above, the engine cylinder head 100 may be configured to form part of a combustion chamber 181. During an exemplary operation of an engine 10 that includes the engine cylinder head 100 (e.g., an engine operated according to a typical four-stroke engine cycle), an intake valve 151 may allow air provided by the intake manifold 170 to enter the combustion chamber 181 through an intake passage 150 as the piston 183 moves away from the bottom surface 103 of the engine cylinder head 100, e.g., during an intake stroke. The air within the combustion chamber 181 may then be compressed as the piston 183 moves toward the bottom surface 103 of the engine cylinder head 100, e.g., during a compression stroke. An air-fuel mixture within the combustion chamber 181 may then be ignited to generate combustion that causes both the pressure and the temperature within the combustion chamber 181 to increase and drives the piston 183 away from the bottom surface 103 of the engine cylinder head 100, e.g., during a power stroke. An exhaust valve 161 may then allow the exhaust within the combustion chamber 181 to exit the combustion chamber 181 through an exhaust passage 160 as the piston 183 again moves toward the bottom surface 103 of the engine cylinder head 100, e.g., during an exhaust stroke.

Throughout the operation of the engine 10, an ICPS 190 disposed within the engine cylinder head 100, such as within the ICPS bore 120, may be configured to detect and output a signal corresponding to the pressure within the combustion chamber 181. For example, the ICPS 190 may be configured to detect and output a signal corresponding to the highest pressure reached within the combustion chamber 181 during the compression stroke or the power stroke, or any anomalous pressures observed within the combustion chamber 181 during the intake stroke or the exhaust stroke (e.g., pressures that are higher than an expected pressure). Pressure data generated by the ICPS 190 may be provided to a controller, e.g., an electronic control module (not shown), configured to orchestrate the operation of the engine 10, in order to optimize the operation of the engine 10.

Generally, as mentioned above, to detect the pressure within a combustion chamber 181, at least a portion of the ICPS 190 may be placed in close proximity to the combustion chamber 181. However, in some circumstances, a combustion chamber 181 may be capable of producing an amount of heat that can affect the operation of, or even damage, the ICPS 190. As described in further detail above and below, various features of the ICPS bore 120 may function to reduce the amount of heat that the ICPS 190 disposed within the engine cylinder head 100 is exposed to during the operation of the engine 10.

For example, by disposing the ICPS bore 120 of the engine cylinder head 100 on a side or within a quadrant that is away from the exhaust passage 160 of the engine cylinder head 100 (as described above), the ICPS bore 120 may reduce the amount of heat that the ICPS 190 disposed within the ICPS bore 120 is exposed to during the operation of the engine 10, due to the temperature difference between the exhaust passage 160 and the intake passage 150. By disposing the ICPS bore 120 of the engine cylinder head 100 along a direction 121 that is transverse to the first plane 112 defined by the central normal axis 106 and the central longitudinal axis 102 and/or transverse to the second plane 114 defined by the central normal axis 106 and the central lateral axis 104 (as described above), the ICPS bore 120 may reduce the amount of heat than the ICPS 190 disposed within the ICPS bore 120 is exposed to during the operation of the engine 10 by extending the ICPS 190 up and away from a combustion chamber formed in part by the engine cylinder head 100. By disposing the ICPS bore 120 within the engine cylinder head 100 such that a portion of an outer surface of the ICPS bore 120 is in contact with the lubricant channel 130 and/or the coolant channel 140 (as described above), the ICPS bore 120 may reduce the amount of heat that the ICPS 190 disposed within the ICPS bore 120 is exposed to during the operation of the engine 10 by allowing the ICPS 190 to be cooled by a lubricant and/or a coolant received by and through the engine cylinder head 100.

It will be apparent to those skilled in the art that various modifications and variations can be made to the disclosed apparatuses and systems without departing from the scope of the disclosure. Other embodiments of the apparatuses and systems will be apparent to those skilled in the art from consideration of the specification and practice of the apparatuses and systems disclosed herein. It is intended that the specification and examples be considered as exemplary only, with a true scope of the disclosure being indicated by the following claims and their equivalents.

What is claimed is:

1. An engine cylinder head, comprising:
an intake passage;
an exhaust passage;
a coolant channel having a first outer surface including a first portion and a second portion, the first portion being shared with the intake passage and the second portion being shared with the exhaust passage;
a lubricant channel; and
an in-cylinder pressure sensor (ICPS) bore at least partially defined by at least one wall having at least one second outer surface including a third portion and a fourth portion, the third portion being shared with the coolant channel and the fourth portion being shared with the lubricant channel.

2. The engine cylinder head of claim 1, wherein:
the ICPS bore includes a first segment with a first diameter and a second segment with a second diameter smaller than the first diameter;
the first segment includes the third portion of the at least one second outer surface; and
the second segment includes the fourth portion of the at least one second outer surface.

3. The engine cylinder head of claim 1, wherein the ICPS bore includes three different segments with three different diameters.

4. The engine cylinder head of claim 1, further comprising:
a substantially flat top surface; and
a substantially flat bottom surface,
wherein the ICPS bore is disposed within the engine cylinder head along a direction that is transverse to a first plane defined by the top surface and a second plane defined by the bottom surface at acute or obtuse angles.

5. The engine cylinder head of claim 1, further comprising:
a central longitudinal axis;
a central lateral axis; and
a central normal axis orthogonal to the central longitudinal axis and to the central lateral axis, wherein the ICPS bore is disposed within the engine cylinder head along a direction that is transverse to a plane defined by the central longitudinal axis and the central normal axis.

6. The engine cylinder head of claim 1, further comprising:
a central longitudinal axis, a central lateral axis, and a central normal axis orthogonal to the central longitudinal axis and to the central lateral axis; and
a substantially flat top surface and a substantially flat bottom surface,
wherein the ICPS bore is disposed within the engine cylinder head along a direction that is transverse to a first plane defined by the central longitudinal axis and the central normal axis and transverse to a second plane defined by the top surface and a third plane defined by the bottom surface at acute or obtuse angles.

7. The engine cylinder head of claim 1, further comprising:

a central longitudinal axis;

a central lateral axis; and a central normal axis orthogonal to the central longitudinal axis and to the central lateral axis, wherein the intake passage is disposed on a first side of a plane defined by the central longitudinal axis and the central normal axis, wherein the exhaust passage is disposed on a second side of the plane, and wherein the ICPS bore is disposed within the engine cylinder head on the first side of the plane.

8. The engine cylinder head of claim 1, further comprising:

a central longitudinal axis;

a central lateral axis;

a central normal axis orthogonal to the central longitudinal axis and to the central lateral axis; and an intake manifold disposed on a first side of a plane defined by the central lateral axis and the central normal axis, wherein the ICPS bore is disposed within the engine cylinder head on a second side of the plane.

9. The engine cylinder head of claim 1, further comprising:

an intake manifold; and a central longitudinal axis, a central lateral axis, and a central normal axis orthogonal to the central longitudinal axis and to the central lateral axis, wherein the central longitudinal axis and the central normal axis define a first plane having a first side and a second side, wherein the central lateral axis and the central normal axis define a second plane having a third side and a fourth side, wherein the intake passage is disposed on the first side of the first plane, wherein the exhaust passage is disposed on the second side of the first plane, wherein the intake manifold is disposed on the third side of the second plane, and wherein the ICPS bore is disposed within the engine cylinder head on the first side of the first plane and on the fourth side of the second plane.

10. An engine cylinder head system, comprising:

an engine cylinder head comprising:

an intake passage;

an exhaust passage;

a coolant channel having a first outer surface including a first portion and a second portion, the first portion being shared with the intake passage and the second portion being shared with the exhaust passage;

a lubricant channel; and an in-cylinder pressure sensor (ICPS) bore including a first segment having a first diameter and being at least partially defined by a first wall having a second outer surface, the first wall sharing a third portion of the second outer surface with the coolant channel, and a second segment having a second diameter that is smaller than the first diameter and being at least partially defined by a second wall having a third outer surface, the second wall sharing a fourth portion of the third outer surface with the lubricant channel; and an ICPS disposed within the ICPS bore.

11. The engine cylinder head system of claim 10, wherein the ICPS bore includes three different segments with three different diameters.

12. The engine cylinder head system of claim 10, further comprising:

a central longitudinal axis, a central lateral axis, and a central normal axis orthogonal to the central longitudinal axis and to the central lateral axis; and an intake manifold disposed on a first side of a plane defined by the central lateral axis and the central normal axis, wherein the ICPS bore is disposed within the engine cylinder head on a second side of the plane.

13. The engine cylinder head system of claim 10, further comprising:

a central longitudinal axis, a central lateral axis, and a central normal axis orthogonal to the central longitudinal axis and to the central lateral axis, wherein the intake passage is disposed on a first side of a plane defined by the central longitudinal axis and the central normal axis, wherein the exhaust passage is disposed on a second side of the plane, and wherein the ICPS bore is disposed within the engine cylinder head on the first side of the plane.

14. The engine cylinder head system of claim 10, wherein a bottom surface of the engine cylinder head forms a top of a combustion chamber and wherein only a lowermost tip of the ICPS is exposed to the combustion chamber.

15. The engine cylinder head system of claim 14, wherein the ICPS includes a piezoelectric sensor.

* * * * *